United States Patent
Pelissier et al.

(10) Patent No.: US 11,698,993 B2
(45) Date of Patent: Jul. 11, 2023

(54) INTEGRATED CIRCUIT CONFIGURED TO PERFORM SYMMETRIC ENCRYPTION OPERATIONS WITH SECRET KEY PROTECTION

(71) Applicants: STMicroelectronics (Grenoble 2) SAS, Grenoble (FR); STMicroelectronics (Alps) SAS, Grenoble (FR)

(72) Inventors: Gilles Pelissier, Eybens (FR); Nicolas Anquet, Grenoble (FR); Delphine Le-Goascoz, Grenoble (FR)

(73) Assignees: STMicroelectronics (Grenoble 2) SAS, Grenoble (FR); STMicroelectronics (Alps) SAS, Grenoble (FR)

( * ) Notice: Subject to any disclaimer, the term of this patent is extended or adjusted under 35 U.S.C. 154(b) by 77 days.

(21) Appl. No.: 17/161,544

(22) Filed: Jan. 28, 2021

(65) Prior Publication Data
US 2021/0240863 A1     Aug. 5, 2021

(30) Foreign Application Priority Data
Jan. 31, 2020  (FR) ...................................... 2000994

(51) Int. Cl.
*G06F 21/72*  (2013.01)
*H04L 9/06*   (2006.01)
*H04L 9/08*   (2006.01)

(52) U.S. Cl.
CPC ................ *G06F 21/72* (2013.01); *H04L 9/06* (2013.01); *H04L 9/0866* (2013.01); *G06F 2221/2113* (2013.01)

(58) Field of Classification Search
CPC ................... G06F 21/72; G06F 21/602; G06F 2221/2113; G06F 2221/2107; H04L 9/06; H04L 9/0866
See application file for complete search history.

(56) References Cited

U.S. PATENT DOCUMENTS

| | | |
|---|---|---|
| 7,490,239 B2 | 2/2009 | Beeson |
| 7,500,272 B2 | 3/2009 | Wheeler et al. |
| 7,693,277 B2 | 4/2010 | Beeson |

(Continued)

FOREIGN PATENT DOCUMENTS

| | | |
|---|---|---|
| WO | 2004032413 A1 | 4/2004 |
| WO | 2011149983 A2 | 12/2011 |
| WO | 2015038690 A1 | 3/2015 |

OTHER PUBLICATIONS

INPI Search Report and Written Opinion for FR Appl. No. 2000994 dated Sep. 25, 2020 (10 pages).

*Primary Examiner* — Philip J Chea
*Assistant Examiner* — Sangseok Park
(74) *Attorney, Agent, or Firm* — Crowe & Dunlevy

(57) ABSTRACT

A unique hardware key is recorded a secure hardware environment. A first logic circuit of the secure hardware environment is configured to generate a unique derived key from said unique hardware key and at least one piece of information. The at least one piece of information relates to one or more of an execution context and a use of a secret key. The secure hardware environment further includes a first encryption device that performs a symmetric encryption of the secret key using the unique derived key. This symmetric encryption generates an encrypted secret key for use outside of the secure hardware environment.

12 Claims, 3 Drawing Sheets

(56) References Cited

U.S. PATENT DOCUMENTS

| | | |
|---|---|---|
| 9,069,634 B2 | 6/2015 | Oka et al. |
| 9,537,657 B1 | 1/2017 | Char et al. |
| 9,735,962 B1* | 8/2017 | Yang .................... H04L 9/0877 |
| 9,806,887 B1 | 10/2017 | Campagna |
| 10,474,831 B1* | 11/2019 | Volkanov ............ G06F 21/6218 |
| 2005/0132201 A1 | 6/2005 | Pitman et al. |
| 2005/0289349 A1 | 12/2005 | Franke et al. |
| 2006/0156012 A1 | 7/2006 | Beeson |
| 2008/0170694 A1 | 7/2008 | Ryan et al. |
| 2014/0037009 A1 | 2/2014 | Park et al. |
| 2014/0037093 A1 | 2/2014 | Park et al. |
| 2016/0173282 A1* | 6/2016 | Circello ................ H04L 9/0894 |
| | | 380/44 |
| 2017/0093567 A1 | 3/2017 | Gopal et al. |
| 2017/0126414 A1* | 5/2017 | Goel ..................... G06F 3/0679 |
| 2019/0268169 A1* | 8/2019 | Castillo ................ H04L 9/0869 |
| 2021/0124818 A1* | 4/2021 | Muthukumaran .... H04L 9/0894 |
| 2022/0150056 A1* | 5/2022 | Falk ........................ G06F 21/57 |

* cited by examiner

INTEGRATED CIRCUIT CONFIGURED TO PERFORM SYMMETRIC ENCRYPTION OPERATIONS WITH SECRET KEY PROTECTION

PRIORITY CLAIM

This application claims the priority benefit of French Application for Patent No. 2000994, filed on Jan. 31, 2020, the content of which is hereby incorporated by reference in its entirety to the maximum extent allowable by law.

TECHNICAL FIELD

Embodiments and implementations concern integrated circuits designed to perform symmetric encryption operations.

BACKGROUND

Symmetric encryption allows the use of a unique shared key for encrypting and then decrypting binary data. In order to keep the binary data secret, care should be taken to keep the shared key secret.

It is therefore necessary to develop solutions allowing secure management of keys. A known solution includes performing this management using reliable software in a secure environment. This solution has the disadvantage of being complex. In particular, it is difficult to protect the keys managed by the software against certain attacks. Moreover, the management of keys by software can be critical in real time applications. Indeed, the management of keys by software may require a large use of available resources and, for this reason, impact on the operation of real-time applications, in particular their execution time.

There is therefore a need in the art for a solution enabling secure management of keys which does not have the above-mentioned disadvantages.

SUMMARY

In an embodiment, an integrated circuit comprises: a secure hardware environment in which a unique hardware key is recorded, said secure hardware environment comprising a first logic circuit configured to generate a unique derived key from said unique hardware key and at least one piece of information relating to an execution context and/or to a use of a secret key, and wherein the secure hardware environment further comprises a first encryption device configured to perform a symmetric encryption operation of said secret key using said unique derived key and to deliver an encrypted secret key resulting from this operation.

The secure hardware environment is a secure "hardware".

The unique hardware key as associated with a unique integrated circuit.

The first logic circuit therefore makes it possible to generate a unique derived key according to a given use and/or execution context for a given integrated circuit. The first logic circuit thus makes it possible to generate a different unique derived key for each execution context and each use for a given integrated circuit.

The unique hardware key as well as the unique derived key are not accessible outside the secure hardware environment.

The unique derived key is used to encrypt secret keys.

The encrypted secret key can be recorded in an output register. This encrypted secret key can then be recovered by a software from the output register. The software can then manipulate this encrypted secret key outside the secure hardware environment but cannot directly manipulate the non-encrypted secret key. The non-encrypted secret key cannot be read by the software.

Hence, such an integrated circuit makes it possible to obtain a secure storage of secret keys by only storing the secret keys once they are encrypted using the unique derived key.

In addition, the encryption of secret keys depends on the unique hardware key, which is unknown outside of the secure hardware environment, and on a use and/or execution context of the secret key. Such an encryption is therefore robust.

Such an electronic circuit can avoid the use of software dedicated to the management of keys. Indeed, the management of keys is obtained by hardware reinforcement of the secure hardware environment. Such an electronic circuit therefore ensures an improved secure management of keys.

In an advantageous embodiment, the secure hardware environment further comprises a second encryption device configured to perform a symmetric encryption operation of binary data using the secret key and to deliver encrypted binary data resulting from this operation.

The encrypted binary data can then be manipulated outside of the secure hardware environment by software.

In an advantageous embodiment, the secure hardware environment further comprises a first decryption device configured to perform a decryption operation of an encrypted secret key using said unique derived key and to deliver a secret key resulting from this operation outside of the secure hardware environment.

The encrypted secret key may be a key having been previously encrypted by the first encryption device. The secret key delivered by the first decryption device is therefore identical to the secret key from which the encrypted secret key has been delivered by the first encryption device.

Since the secret key is decrypted in the secure hardware environment, the secret key is not accessible by software.

Preferably, the second encryption device is likewise configured to perform an encryption operation of non-encrypted binary data using the secret key delivered by the first decryption device and to deliver encrypted binary data resulting from this operation.

Advantageously, the secure hardware environment further comprises a register, called a key register, configured to record each secret key generated by the first decryption device and to enable transmission of each recorded secret key to the second encryption device in order to encrypt non-encrypted binary data.

In an advantageous embodiment, the secure hardware environment further comprises a second decryption device configured to perform a decryption operation of encrypted binary data using the secret key delivered by the first decryption device and to deliver non-encrypted binary data resulting from this operation outside of the secure hardware environment.

In an advantageous embodiment, the secure hardware environment further comprises a register, called a key register, configured to record each secret key generated by the first decryption device and to enable transmission of each recorded secret key to the second decryption device in order to decrypt encrypted binary data.

According to another aspect, a system-on-chip is proposed comprising an integrated circuit such as described above and configured to execute software according to the execution contexts having different levels of security and/or confidentiality. The integrated circuit is configured to authorize a use of the secret key according to these execution contexts if a protection of the secret key is lifted by software after the secret key is recorded in the key register and if the key is not exclusive to a single execution context.

Such a system allows the use of secret keys by software of different execution contexts while ensuring protection of the secret keys. In particular, the secret keys can be used but remain unknown by the software.

In an advantageous embodiment, the integrated circuit is configured to delete a secret key of the key register, either when a new execution context is detected when the secret key is protected, or when the secret key is exclusive to a given execution context and a new execution context is detected.

The integrated circuit is therefore configured to detect a misuse of the secret keys, in other words a modification of an execution context when this is not authorized.

In addition, the integrated circuit is configured to delete a secret key when this is compromised, in other words as soon as a misuse of the key is detected.

Such an integrated circuit makes it possible to isolate secret keys by execution context and to allow their use in other execution contexts only if this use is authorized.

In an embodiment, a method for encrypting a secret key in a secure hardware environment comprises: generating a unique derived key from a unique hardware key recorded in said secure hardware environment and at least one piece of information relating to an execution context and/or a use of the secret key, and symmetric encrypting of the secret key using the generated unique derived key.

According to another aspect, a method for encrypting binary data in a secure hardware environment comprises: symmetric encrypting the binary data using a secret key so as to obtain encrypted binary data, and symmetric encrypting the secret key according to an encryption method as described above.

According to another aspect, a method for decrypting an encrypted key in a secure hardware environment comprises: generating a unique derived key from a unique hardware key recorded in said secure hardware environment and at least one piece of information relating to an execution context and/or a use of said secret key, and decrypting the encrypted key using the generated unique derived key.

According to another aspect, a method for decrypting, in a secure hardware environment, binary data encrypted with the help of an encrypted secret key comprises: decrypting said encrypted secret key according to a decryption method such as described above, in such a way as to obtain a secret key suitable for decrypting said encrypted binary data, then decrypting the encrypted binary data using said secret key.

BRIEF DESCRIPTION OF THE DRAWINGS

Other advantages and features shall become evident from the detailed description of embodiments and implementations that are in no way limiting, and from the enclosed drawings in which.

DETAILED DESCRIPTION

Figure 1:
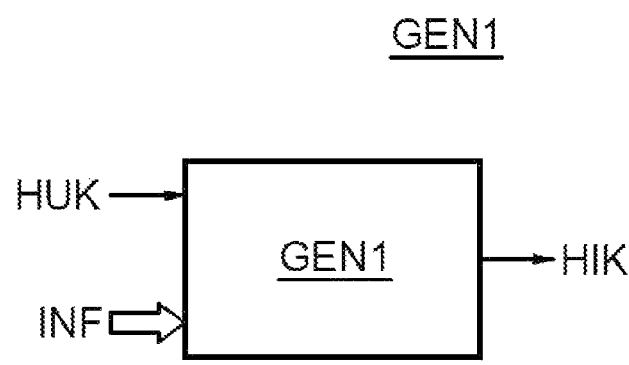
FIG. 1 is a block diagram of a secure hardware environment.
Figure 2:
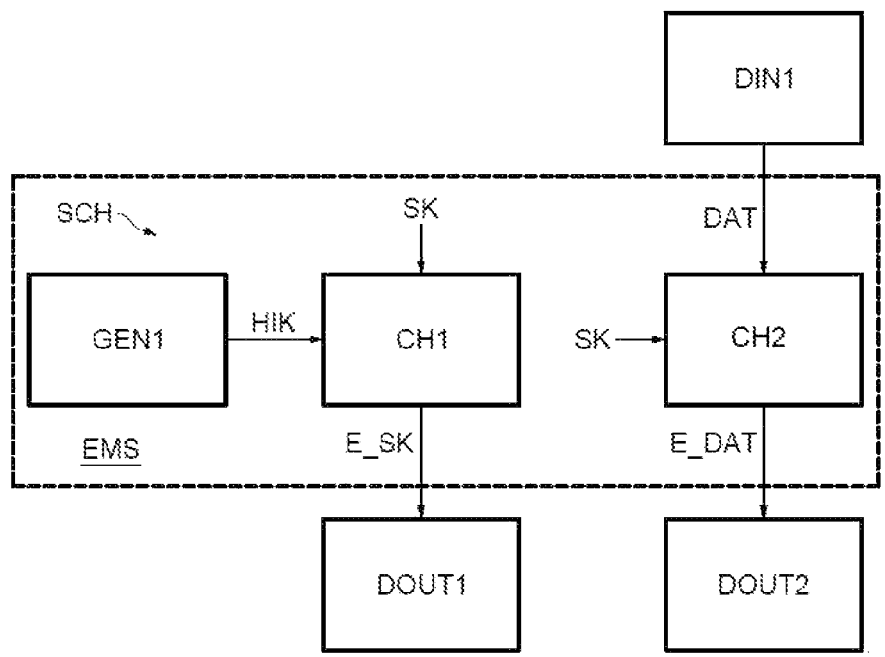
FIG. 2 is a block diagram of an encryption system.
Figure 4:
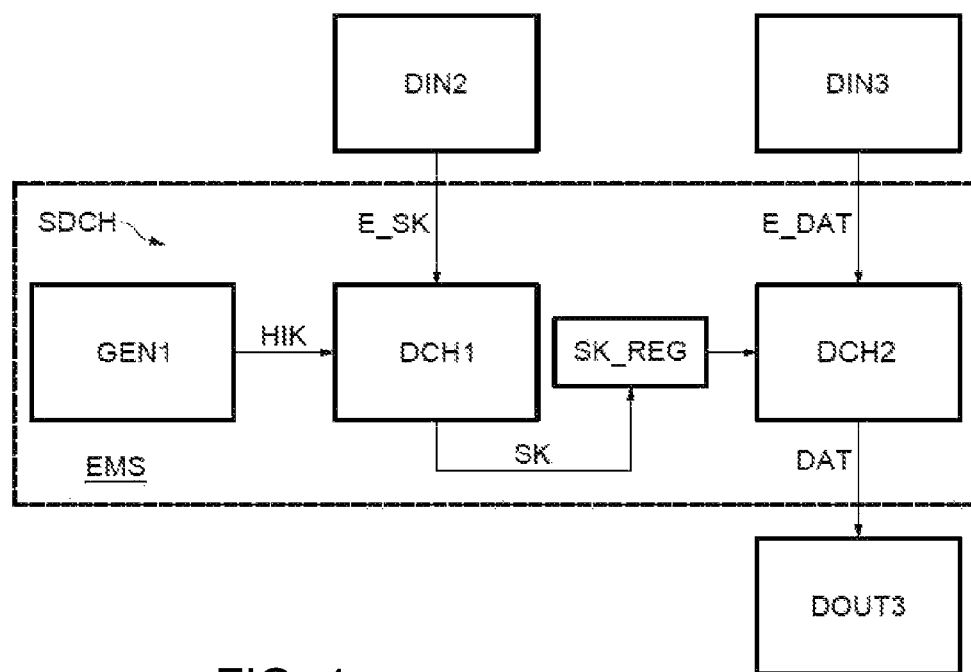
FIG. 4 is a block diagram of a decryption system.

An integrated circuit according to one embodiment comprises a secure hardware environment EMS comprising a first logic circuit GEN1 illustrated in FIG. 1, an encryption system SCH illustrated in FIG. 2 and the decryption system SDCH illustrated in FIG. 4.

The first logic circuit GEN1 is used to generate a unique derived key HIK.

The encryption system SCH is used to encrypt binary data DAT using a secret key SK, and to encrypt this secret key SK using the unique derived key HIK generated by the first logic circuit GEN1.

The decryption system SDCH is used to decrypt an encrypted secret key E_SK using a unique derived key HIK generated by the first logic circuit GEN1, and to decrypt encrypted binary data E_DAT using the decrypted secret key SK. The encryption system SCH and the decryption system SDCH can be combined so as to pool certain elements of these two systems.

The first logic circuit GEN1 is configured to generate the unique derived key HIK from a unique hardware key HUK and at least one piece of information INF relating to an execution context and/or to a use connected to a secret key to be encrypted.

The unique hardware key HUK is recorded in the secure hardware environment EMS. This unique hardware key HUK is associated with the integrated circuit. The unique hardware key HUK is unknown outside of the secure hardware environment EMS and cannot be used outside this environment. The unique hardware key HUK can be obtained by a physical unclonable function (also known under the acronym "PUF").

In particular, the information INF can concern an execution context of the secret key to be encrypted (secure/non-secure execution context, privilege/non-privileged execution context), a use of this secret key (for example a duration of use, a type of sharing) and a use of a software needing to use this secret key. This last use may be obtained by the "root of trust".

Thus, the first logic circuit GEN1 comprises a first input configured to receive said unique hardware key HUK.

The first logic circuit GEN1 also comprises a second input configured to receive said at least one piece of information INF relating to an execution context and/or to a use connected to a secret key to be encrypted.

The first logic circuit GEN1 can also generate the unique derived key HIK according to a given use and/or execution context for a given integrated circuit. The first logic circuit GEN1 can therefore generate a different unique derived key HIK for each execution context and each use, for a given integrated circuit.

The unique derived key HIK is not accessible outside of the secure hardware environment EMS. Thus, a software cannot read the unique derived key HIK but can use it in the secure hardware environment EMS.

The encryption system SCH further comprises a first encryption device CH1 configured to perform a symmetric encryption operation of the secret key SK.

In particular, at least one secret key SK is provided just once during the lifetime of the integrated circuit and is deleted after its use. In particular, the secret key SK may be a key known only by a manufacturer of the integrated circuit, in particular a manufacturer of original equipment. This manufacturer may, therefore, encrypt the secret key SK using the first encryption device CH1.

Alternatively, the secret key SK may be created by means of a random number generator.

The symmetric encryption operation of secret keys SK is carried out using the unique derived key HIK generated by the first logic circuit GEN1. In particular, the secret keys SK can be encrypted using an advanced encryption standard AES, in particular according to the ECB (Electronic Code Book) mode.

Since the encryption of the secret key SK is performed using the unique derived key HIK, the encryption of the secret key SK therefore depends indirectly on the unique hardware key HUK and on a use and/or an execution context linked to this secret key. Such an encryption is therefore robust.

At the end of the encryption operation, the first encryption device CH1 is configured to deliver an encrypted secret key E_SK resulting from this operation.

The encrypted secret key E_SK can be recorded in a first output register DOUT1 outside the secure hardware environment EMS. This encrypted secret key can then be recovered by software from the output register. The software can then manipulate this encrypted secret key outside the secure hardware environment but cannot directly manipulate the non-encrypted secret key SK. The non-encrypted secret key SK cannot be read by the software.

The first output register DOUT1 does not, therefore, store the non-encrypted secret keys SK but only those encrypted keys. The storage of the secret keys SK is thus secure.

Such an electronic circuit can avoid the use of software dedicated to the management of keys. Such an electronic circuit therefore ensures an improved secure management of keys.

Furthermore, the integrated circuit also comprises a first input register DIN1 outside the secure hardware environment EMS. Binary data to be encrypted can be recorded in this first input register.

The encryption system SCH further comprises a second encryption device CH2. This second encryption device CH2 is configured to perform a symmetric encryption operation of the binary data DAT coming from the first input register DIN1. In particular, the second encryption device CH2 is configured to encrypt the binary data DAT using the secret key SK.

The second binary circuit therefore delivers encrypted binary data E_DAT resulting from this symmetric encryption operation.

The integrated circuit comprises a second output register DOUT2 outside the secure hardware environment EMS. The encrypted binary data E_DAT can be recorded in this second output register DOUT2. The encrypted binary data E_DAT can then be manipulated outside the secure hardware environment by a software accessing the second output register DOUT2.

Figure 3:
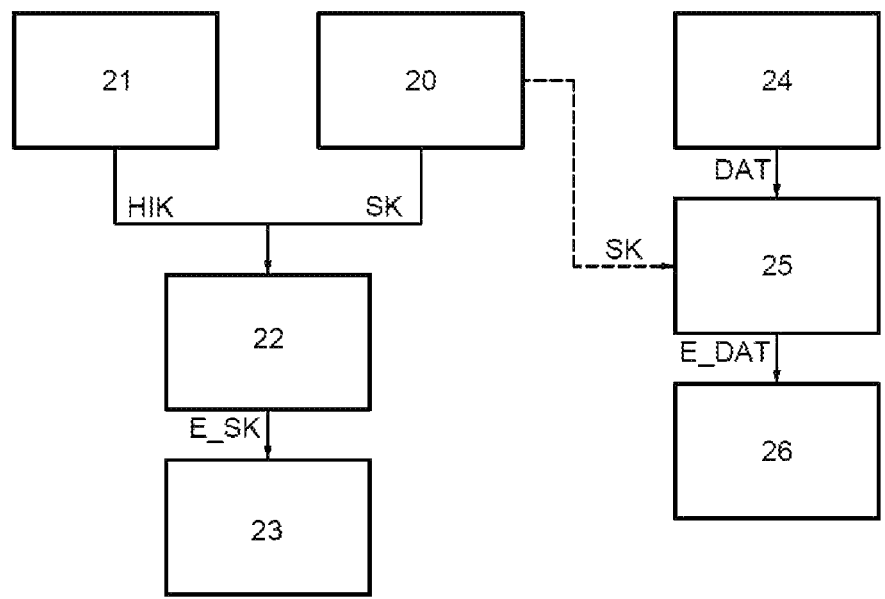
FIG. 3 illustrates a method for encrypting the secret key.

A method for encrypting the secret key SK is illustrated in FIG. 3. In step 20, a secret key SK is supplied to the encryption system during a key provisioning phase. In parallel, in step 21, a unique derived key HIK is generated by the first logic circuit GEN1 using the unique hardware key HUK and information INF relating to a use and/or to an execution context of the secret key SK. In step 22, the secret key SK generated in step 20 is encrypted by the first encryption device CH1 by a symmetric encryption operation using the unique derived key HIK generated in step 21. In step 23, the encrypted secret key E_SK is recorded in the first output register DOUT1. Once encrypted by the system SCH, the key SK can be deleted.

In parallel to the encryption process of the secret key SK, it is possible to implement a binary data DAT encryption process also represented in FIG. 3. In step 24, the binary data DAT are extracted from the first input register DIN1. In step 25, the binary data DAT are encrypted by the second encryption device CH2 by a symmetric encryption operation using the secret key SK generated in step 20. In step 26, the encrypted binary data E_DAT are recorded in the second output register DOUT2.

Reference is now made to FIG. 4. The integrated circuit also comprises a second input register DIN2 outside the secure hardware environment EMS. Encrypted secret keys E_SK can be recorded in this second input register DIN2. In particular, the encrypted secret keys E_SK are secret keys SK having previously been encrypted by the first encryption device CH1. These encrypted secret keys E_SK may have been manipulated in the meantime outside the secure hardware environment by software.

The decryption system SDCH comprises a first decryption device DCH1. This first decryption device DCH1 is configured to decrypt encrypted secret keys E_SK coming from the second input register DIN2. In particular, the first decryption device DCH1 is configured to perform a decryption operation using a unique derived key HIK generated by the first logic circuit GEN1.

More particularly, the encrypted secret keys E_SK can be decrypted using a decryption AES, in particular in accordance with the ECB mode.

The first decryption device DCH1 is therefore configured to deliver a secret key SK identical to the secret key SK from which the encrypted secret key E_SK recorded in the second input device has been generated. It is therefore also important to use, for the decryption of the encrypted secret key E_SK, a unique derived key HIK identical to that used for the encryption of the secret key SK. In particular, the encrypted secret key E_SK cannot be decrypted by a different integrated circuit from that used for the encryption of the secret key SK.

The decrypted secret key SK is not accessible outside the secure hardware environment EMS.

The first decryption device DCH1 and the first encryption device CH1 of the encryption system can be formed by the same device when the encryption system SCH and the decryption system SDCH are combined. This device is then suitable for encrypting keys SK and decrypting encrypted keys E_SK.

The decryption system SDCH also comprises a register, called a key register, SK_REG in which the secret keys SK decrypted by the first decryption device DCH1 are recorded.

The integrated circuit also comprises a third input register DIN3 outside the secure hardware environment EMS. Encrypted binary data E_DAT can be recorded in this third input register DIN3. In particular, the encrypted binary data E_DAT are binary data DAT having previously been encrypted by the second encryption device CH2. These encrypted binary data E_DAT may have been manipulated meanwhile outside the secure hardware environment by software.

The decryption system SDCH further comprises a second decryption device DCH2. This second decryption device DCH2 is configured to decrypt encrypted binary data E_DAT coming from the third input register DIN3. In particular, the second decryption device DCH2 is configured to perform a decryption operation using a secret key SK decrypted by the first decryption device DCH1 and recorded in the key register SK_REG.

The second decryption device DCH2 is therefore configured to deliver decrypted binary data DAT identical to those from which the encrypted binary data E_DAT recorded in the third input register DIN3 has been encrypted. In addition, the encrypted binary data E_DAT cannot be decrypted by a different integrated circuit from that used for the encryption of the binary data DAT. Indeed, these binary data DAT have been encrypted using the secret key SK. This secret key SK has then been encrypted in order to obtain the encrypted secret key E_SK. In order to decrypt the encrypted secret key E_SK, it is necessary to use the same key HIK as that used for the encryption of the secret key SK. However, the key HIK depends in particular on the unique hardware key HUK associated with the integrated circuit. Hence, the integrated circuit can be used as an anti-cloning system in order to prevent the encrypted binary data E_DAT being able to be decrypted by another integrated circuit.

The integrated circuit also comprises a third output register DOUT3 outside the secure hardware environment EMS. The decrypted binary data DAT delivered by the second decryption device DCH2 can be recorded in this third output register DOUT3 in such a way that it can be used by a software.

The second decryption device DCH2 and the second encryption device CH2 of the encryption system SCH can be formed by the same device when the encryption system SCH and the decryption system SDCH are combined. This device is then capable of encrypting binary data DAT and decrypting encrypted binary data E_DAT.

Figure 5:
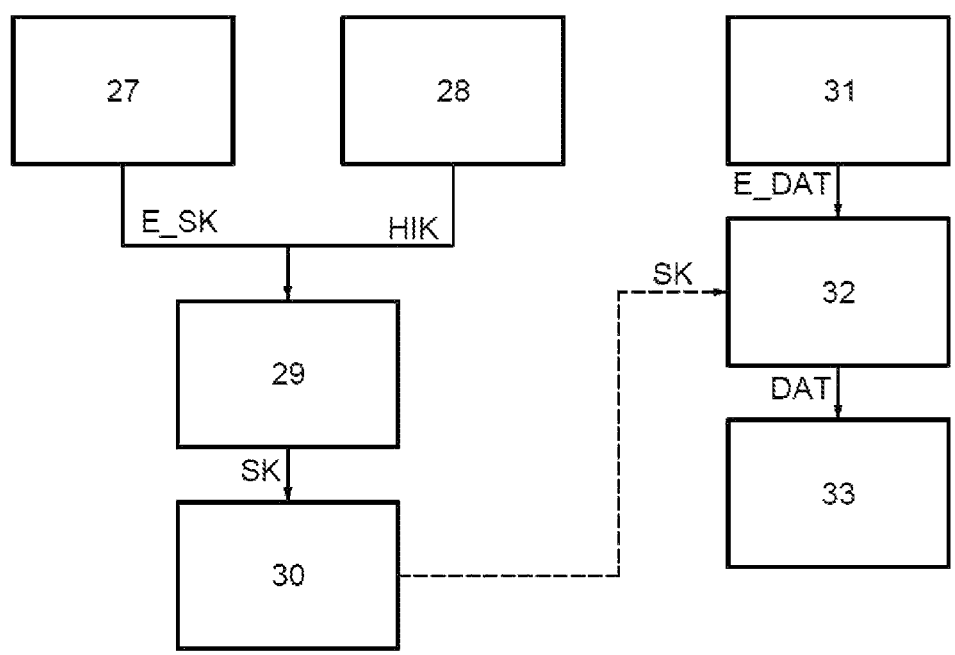
FIG. 5 illustrates a method for decrypting the secret key.

A method for decrypting an encrypted secret key E_SK is illustrated in FIG. 5. In step 27, an encrypted secret key E_SK is extracted from the second input register DIN2. In step 28, a unique derived key HIK is generated by the first logic circuit GEN1 using the unique hardware key HUK and information INF relating to a use and/or to an execution context of the secret key. In step 29, the encrypted secret key E_SK extracted in step 27 is decrypted by the first decryption device DCH1 by a decryption operation using the unique derived key HIK generated in step 28. In step 30, the decrypted secret key SK is recorded in the key register SK_REG.

It is then possible to implement a method for decrypting encrypted binary data E_DAT, also illustrated in FIG. 5. In step 31, the encrypted binary data E_DAT are extracted from the third input register DIN3. In step 32, the encrypted binary data E_DAT are decrypted by the second decryption device DCH2 using the secret key SK recorded in the key register SK_REG in step 30. In step 33, the decrypted binary data DAT are recorded in the third output register DOUT3.

Similarly, it is possible to implement an encryption method of binary data DAT using a secret key SK decrypted from an encrypted secret key E_SK according to a decryption method as described above. The binary data are then encrypted by the encryption device CH2, which can also be the decryption device DCH2 when the encryption system SCH and the decryption system SDCH are combined.

An integrated circuit, such as described above, can be used in a system-on-chip configured to execute software according to execution contexts having different levels of security and/or confidentiality.

The integrated circuit is then configured to authorize the use of the secret key SK according to these execution contexts if a protection of the secret key SK is lifted by a software after the secret key SK is recorded in the key register SK_REG and if the key is not exclusive to a single execution context. The integrated circuit therefore allows a given software to manage an unlimited number of unknown secret keys SK which are usable by software having different execution contexts.

In addition, the integrated circuit is also configured to delete a secret key SK of the key register SK_REG either when a new execution context is detected when the secret key SK is protected, or when the secret key SK is exclusive to a given execution context and a new execution context is detected.

The integrated circuit is therefore configured to detect a misuse of the secret keys, in other words a modification of an execution context when this is not authorized.

Such a system allows the use of secret keys SK by software of different execution contexts based on management of keys in a secure hardware environment EMS enabling protection of the secret keys SK to be ensured. Such a key management enables the use of secret keys SK for different execution contexts. In particular, the secret keys SK can be used but remain unknown by the software.

More particularly, such a system makes it possible to isolate secret keys SK by execution context and to allow their use in other execution contexts only if this use is authorized.

In addition, the integrated circuit is configured to delete a secret key SK when this is compromised, in other words as soon as a misuse of the key is detected.

The invention claimed is:

1. An integrated circuit, comprising:
a secure hardware environment configured to record a unique hardware key and comprising:
a first logic circuit configured to generate a unique derived key from said unique hardware key and at least one piece of information, wherein said at least one piece of information relates to one or more of an execution context and a use of a secret key;
a first encryption device configured to perform a symmetric encryption operation of said secret key using said unique derived key and to deliver an encrypted secret key outside the secure hardware environment which results from performance of the symmetric encryption operation;
a second encryption device configured to perform a further symmetric encryption operation of binary data using the secret key and to deliver encrypted binary data outside the secure hardware environment which results from performance of the further symmetric encryption operation
a first decryption device configured to perform a decryption operation of an encrypted secret key using said unique derived key and to deliver a secret key resulting from performance of the operation decryption; and
a second decryption device configured to perform a further decryption operation of encrypted binary data using the secret key delivered by the first decryption device and to deliver non-encrypted binary data resulting from performance of the further decryption operation.

2. The integrated circuit according to claim 1, wherein the secure hardware environment further comprises a key register configured to record each secret key generated by the first decryption device and to enable transmission of each recorded secret key to the second decryption device in order to decrypt encrypted binary data.

3. The integrated circuit according to claim 1, wherein the second encryption device is also configured to perform an encryption operation of non-encrypted binary data using the secret key delivered by the first decryption device and to deliver encrypted binary data resulting from performance of the encryption operation.

4. The integrated circuit according to claim 3, wherein the secure hardware environment further comprises a key register configured to record the secret key generated by the first decryption device and to enable transmission of the recorded secret key to the second encryption device in order to encrypt non-encrypted binary data.

5. A system-on-chip, comprising:
an integrated circuit including a secure hardware environment configured to record a unique hardware key and comprising:
a first logic circuit configured to generate a unique derived key from said unique hardware key and at least one piece of information, wherein said at least one piece of information relates to one or more of an execution context and a use of a secret key;
a first encryption device configured to perform a symmetric encryption operation of said secret key using said unique derived key and to deliver an encrypted secret key outside the secure hardware environment which results from performance of the symmetric encryption operation;
a first decryption device configured to perform a decryption operation of an encrypted secret key using said unique derived key and to deliver a secret key resulting from performance of the operation decryption; and
a key register configured to record the secret key generated by the first decryption device;
wherein said system-on-chip is configured to execute software according to execution contexts having different levels of security or confidentiality; and
wherein the integrated circuit is configured to authorize a use of the secret key according to the execution contexts if a protection of the secret key is removed by software after the secret key is recorded in the key register and if the key is not exclusive to a single execution context.

6. The system-on-chip according to claim 5, wherein the integrated circuit is configured to delete the secret key from the key register in response to one or more of:
when a new execution context is detected when the secret key is protected; and
when the secret key is exclusive to a given execution context and a new execution context is detected.

7. The system-on-chip according to claim 5, wherein the secure hardware environment further comprises a second encryption device configured to perform a further symmetric encryption operation of binary data using the secret key and to deliver encrypted binary data outside the secure hardware environment which results from performance of the further symmetric encryption operation.

8. The system-on-chip according to claim 7, wherein the key register is configured to enable transmission of the recorded secret key to the second encryption device in order to encrypt said binary data.

9. A system-on-chip, comprising:
an integrated circuit including a secure hardware environment configured to record a unique hardware key and comprising:
a first logic circuit configured to generate a unique derived key from said unique hardware key and at least one piece of information, wherein said at least one piece of information relates to one or more of an execution context and a use of a secret key;
a first encryption device configured to perform a symmetric encryption operation of said secret key using said unique derived key and to deliver an encrypted secret key outside the secure hardware environment which results from performance of the symmetric encryption operation;
a first decryption device configured to perform a decryption operation of an encrypted secret key using said unique derived key and to deliver a secret key resulting from performance of the operation decryption;
a key register configured to record the secret key generated by the first decryption device; and
a second decryption device configured to perform a decryption operation of encrypted binary data using the secret key delivered by the first decryption device and to deliver non-encrypted binary data resulting from performance of the decryption operation;
wherein said system-on-chip is configured to execute software according to execution contexts having different levels of security or confidentiality; and
wherein the integrated circuit is configured to authorize a use of the secret key according to the execution contexts if a protection of the secret key is removed by software after the secret key is recorded in the key register and if the key is not exclusive to a single execution context.

10. The system-on-chip according to claim 9, wherein the integrated circuit is configured to delete the secret key from the key register in response to one or more of:
when a new execution context is detected when the secret key is protected; and
when the secret key is exclusive to a given execution context and a new execution context is detected.

11. The system-on-chip according to claim 9, wherein the secure hardware environment further comprises a second encryption device configured to perform a further symmetric encryption operation of binary data using the secret key and to deliver encrypted binary data outside the secure hardware environment which results from performance of the further symmetric encryption operation.

12. The system-on-chip according to claim 11, wherein the key register is configured to enable transmission of the recorded secret key to the second encryption device in order to encrypt said binary data.

* * * * *